United States Patent
Attallah et al.

(10) Patent No.: US 8,825,329 B2
(45) Date of Patent: Sep. 2, 2014

(54) OPERATING METHOD FOR A MOTOR VEHICLE COMPRISING IN PARTICULAR AN ELECTRONICALLY CONTROLLED PARKING BRAKE SYSTEM

(75) Inventors: Faouzi Attallah, Darmstadt (DE); Christof Maron, Kelkheim (DE); Heinz-Anton Schneider, Niedernhausen (DE); Oliver Stamatoski, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 13 days.

(21) Appl. No.: 13/582,541

(22) PCT Filed: Mar. 3, 2011

(86) PCT No.: PCT/EP2011/053209
§ 371 (c)(1), (2), (4) Date: Dec. 13, 2012

(87) PCT Pub. No.: WO2011/107551
PCT Pub. Date: Sep. 9, 2011

(65) Prior Publication Data
US 2013/0103277 A1    Apr. 25, 2013

(30) Foreign Application Priority Data
Mar. 5, 2010 (DE) .......................... 10 2010 002 626

(51) Int. Cl.
*B60T 8/172* (2006.01)
*B60T 8/88* (2006.01)
*B60T 7/12* (2006.01)

(52) U.S. Cl.
CPC .......... *B60T 8/172* (2013.01); *B60T 2270/406* (2013.01); *B60T 8/885* (2013.01); *B60T 7/122* (2013.01); *B60T 2201/06* (2013.01)
USPC .......................................................... 701/70

(58) Field of Classification Search
USPC .......................................................... 701/70
See application file for complete search history.

(56) References Cited

U.S. PATENT DOCUMENTS

| 4,629,043 | A | 12/1986 | Matsuo et al. |
| 7,185,745 | B2 * | 3/2007 | Godlewsky et al. .......... 188/158 |

(Continued)

FOREIGN PATENT DOCUMENTS

| DE | 10253211 | 4/2004 |
| EP | 1327566 | 7/2003 |

(Continued)

OTHER PUBLICATIONS

International Application Serial No. PCT/EP2011/053209, International Search Report filed May 31, 2011, 6 pgs.

*Primary Examiner* — Thomas Tarcza
*Assistant Examiner* — Alex C Dunn
(74) *Attorney, Agent, or Firm* — RatnerPrestia

(57) ABSTRACT

An operating method for a motor vehicle including an electronically controlled motor vehicle brake system, having an automated brake release function. A start-up request is determined electronically in an automated manner and subsequently at least one electronic command is transmitted to a parking brake actuating mechanism in order to release the brake, and the electronic unit EPB-ESC-ECU is networked with communication partners, for example, electronic units, sensors and/or data-bus systems in order to exchange signals and/or data with these communication partners, and including an electronic routine for providing software, configuring and/or calibrating the motor vehicle brake system. For improved operation, in a more flexible configuration routine, the routine for providing software, configuring and/or calibrating the motor vehicle brake system is embodied in a multi-level manner, and subsequent to the vehicle being produced the motor vehicle brake system includes at least self-learning properties in terms of an automated configuration routine.

12 Claims, 1 Drawing Sheet

(56) References Cited

U.S. PATENT DOCUMENTS

| | | |
|---|---|---|
| 7,206,682 B2 | 4/2007 | Bodin |
| 7,665,808 B2* | 2/2010 | Deprez et al. ............... 303/192 |
| 8,428,813 B2* | 4/2013 | Gilbert ..................... 701/31.4 |
| 8,452,507 B2* | 5/2013 | Poertzgen et al. ............ 701/70 |
| 2005/0065678 A1* | 3/2005 | Smith et al. ................ 701/29 |
| 2006/0049691 A1* | 3/2006 | Deprez et al. ............... 303/191 |
| 2006/0273658 A1 | 12/2006 | Halassy-Wimmer et al. |
| 2007/0225890 A1* | 9/2007 | Ringlstetter ................ 701/70 |
| 2007/0240947 A1* | 10/2007 | Goss et al. ................ 188/158 |
| 2008/0041147 A1* | 2/2008 | David ..................... 73/117 |
| 2010/0049400 A1* | 2/2010 | Duraiswamy et al. ......... 701/35 |
| 2011/0190979 A1 | 8/2011 | Monti |
| 2011/0240418 A1* | 10/2011 | Tachiiri ................... 188/72.4 |
| 2013/0226424 A1* | 8/2013 | Knechtges et al. ........... 701/70 |

FOREIGN PATENT DOCUMENTS

| | | |
|---|---|---|
| FR | 2828450 | 2/2003 |
| FR | 2934549 | 2/2010 |

\* cited by examiner

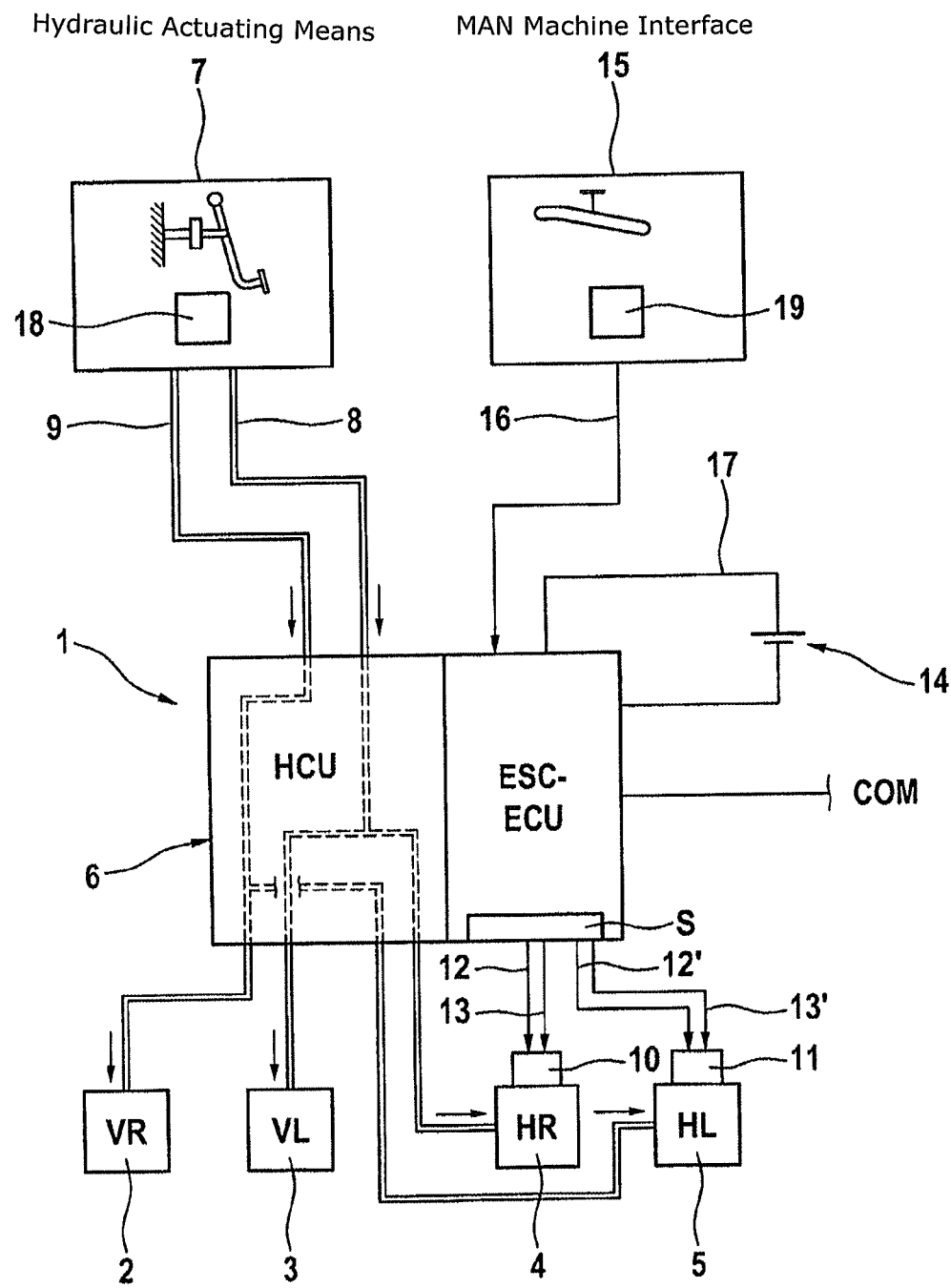

OPERATING METHOD FOR A MOTOR VEHICLE COMPRISING IN PARTICULAR AN ELECTRONICALLY CONTROLLED PARKING BRAKE SYSTEM

CROSS REFERENCE TO RELATED APPLICATIONS

This application is the U.S. National Phase Application of PCT International Application No. PCT/EP2011/053209, filed Mar. 3, 2011, which claims priority to German Patent Application No. DE 10 2010 002 626.3, filed Mar. 5, 2010, the contents of such applications being incorporated by reference herein.

FIELD OF THE INVENTION

The invention relates to an operating method for a motor vehicle comprising electro-mechanical actuators in particular comprising an automated brake release function, wherein a start-up request is determined electronically, in that an electronic unit (EPB–ESC–EPB–ESC–ECU) that is connected to the actuators whilst processing at least one signal from at least one sensor and/or man-machine interface, for example in particular, an angle of inclination sensor, a wheel rotation sensor, a coupling sensor or the like, that is preferably directly connected to the electronic unit (EPB–ESC–EPB–ESC–ECU), and whilst using stored parameters, data and/or software the start-up request is determined electronically in an automated manner, and subsequently at least one electronic command is transmitted to the electro-mechanical actuators in order to release the brake and wherein the electronic unit (EPB–ESC–ECU) is provided networked to communication partners, for example, in particular to the electronic units, sensors and/or data-bus systems, in order to exchange signals and/or data with the communication partners, and comprising an electronic routine for providing software, configuring and/or calibrating the motor vehicle brake system. The invention comprises in particular a motor vehicle brake system having electro-mechanical actuators having an automated brake release function, wherein an electronic unit, which is connected to the actuators, whilst processing at least one signal, which represents a driver's request, whilst using at least one sensor and/or switch, for example, in particular, an angle of inclination sensor, a wheel rotation sensor, a coupling sensor or the like, which is preferably connected to the electronic control unit directly or by way of a network connection (e.g. CAN), and whilst using stored parameters, data and/or programs that electronically determine in an automated manner a start-up request and subsequently at least one electronic command is transmitted to the actuators in order to release the brake, wherein the electronic unit is provided networked to further electronic units, sensors and/or data bus systems and exchanges signals and/or data therewith.

BACKGROUND OF THE INVENTION

A fundamental operating method for a parking brake system is known from U.S. Pat. No. 4,629,043 A1, which is incorporated by reference, said parking brake system having an electronic unit comprising an automated brake release function in response to a plurality of sensor signals, for example, in particular an angle of inclination sensor.

An operating method of the generic type having an automated brake release function is known from the dissertation "Netzwerkintegration von Fahrzeugkomponenten am Beispiel einer Elektrischen Feststellbremse . . . " [Network integration of vehicle components using as an example an electric parking brake . . . ], Ralf Leiter, Fahrwerkstech, Nov./Dec. 3, 2003. According to said dissertation, it is provided that a separate electronic parking brake unit is initialized whilst using a predetermined protocol whilst using a diagnostic connection via CAN by way of an end of line configuration performed by the vehicle manufacturer, and wherein the electronic parking brake unit during operation communicates mainly with an electronic stability program (ESP) electronic unit that assumes the brake management for a hydraulically actuated and also independently controlled service brake system.

It is possible to improve the known method for bringing the motor vehicle into service. Taking into consideration a plurality of electronic control devices in a modern motor vehicle, a comprehensive end-of-line programming is not without problems and increases considerably the expenditure by the vehicle manufacturer because it increases the in-house production depth. Characteristics, parameters and software are permanently written to a memory during the vehicle production process.

SUMMARY OF THE INVENTION

Therefore, the present invention aims to reduce the disadvantages of the prior art.

In order to achieve this, the invention provides that the configuration routine of the electronic unit is embodied in a modular/multi-level manner and wherein subsequent to the vehicle being produced the electronic unit comprises at least to a limited extent self-learning properties in terms of an automated configuration routine.

BRIEF DESCRIPTION OF THE DRAWINGS

The invention is best understood from the following detailed description when read in connection with the accompanying drawing. Included in the drawings is the following FIGURE:

FIG. 1 shows a circuit diagram of a motor vehicle brake system.

DETAILED DESCRIPTION OF THE PREFERRED EMBODIMENTS

A multi-circuit, electro-hydraulically actuated motor vehicle brake system 1 is evident in FIG. 1. Said system comprises a plurality of brake calipers 2-5 having hydraulically actuated actuators that are organized in a plurality of hydraulic brake circuits, and are hydraulically connected to an electronically controlled assembly 6 comprising an electronic unit (EPB+ESC–EPB–ESC–ECU) and a hydraulic control unit (HCU) comprising a motor-pump assembly and also electro-hydraulic valves for providing hydraulic energy. In so doing, the hydraulically actuated actuators can be actuated in response to the driver's demand by means of a hydraulic actuating means 7 by way of continuous hydraulic lines 8, 9, and the assembly 6 makes available in this connection fundamentally an electronically controlled brake torque distribution (EBD) for the disk calipers 2-5. A further function resides in the fact that the brake calipers 2-5 can be actuated independently of the driver by means of the assembly 6, in particular by means of an electronic stability program (ESC). In order to render possible further electronic assistance functions, in particular to actuate or release a parking brake effect on the basis of a parking brake request, at least some of the brake calipers 2-5 comprise additional or separate electro-mechanical actuators 10, 11 that have a high efficiency factor. The electro-mechanical actuators 10, 11 can be provided in conjunction with a disk brake, or can act on a drum brake, said actuators preferably being arranged in each case on a rear axle. The invention can also be used in the case of other friction or latching mechanisms that are used to park vehicle wheels. At least one electrical current source 14 is electrically connected to the electronic unit EPB–ESC–ECU for the purpose of supplying electricity. This same connection is used fundamentally to supply electricity to the assembly 6 and also to the consumer connected thereto. The electronic unit EPB+ESC–EPB–ESC–ECU is connected to the electro-mechanical actuators 10, 11 by way of in each case at least two separate electrical supply lines 12, 13. In addition, the electronic unit EPB+ESC–EPB–ESC–ECU comprises at least one electrical switching means in order to supply the electro-mechanically actuated actuators 10, 11 in an electrically reversible manner. It goes without saying that when using three-phase current drives, three supply lines can be provided in the region of the actuators 10, 11.

The known switching means can comprise in addition integrated means for reversing at least one of the electro-mechanical actuators 10, 11 in order to release an actuated parking brake function. The specific embodiment of reversing means of this type can be varied. When using a direct current gear motor in the region of the actuators 10, 11, semi-conductor switches that function like a relay can be sufficient for reversing in a simple manner the polarity of the current direction in the two supply lines 12, 13. On the other hand, in particular, when using multi-phase, in particular brushless direct current motors, it is preferred to integrate switching means that comprise semi-conductor switching means in a so-called MOS-FET-H-bridge switching arrangement in order to render possible the multi-quadrant operation.

At least one additional electrical interface S, for example, having at least one additional electrical plug-in element for providing the electrical connection to the at least two electrical supply lines 12, 13; 12', 13' is used to connect the electronic unit EPB+ESC–EPB–ESC–ECU to its peripheral devices, for example, in particular to the actuators 10, 12. A bus connection COM is provided within a vehicle network topology for integration and communication of the ESC+EPB–EPB–ESC–ECU. Further connections of the actuating sensors 18, 19, wheel rotation sensors, pressure sensors or the like are not illustrated.

In addition, a man-machine interface 15, which is in the form of a switch or button, and a switching means that is integrated on the EPB–ESC–ECU side and not explicitly illustrated is connected in series in relation to the actuators 10, 11. An electrical connection line 16 is used to provide the electrical connection between the man-machine interface 15 and the EPB–ESC–ECU.

Although the schematic illustration in FIG. 1 does not show this form in detail, it is advantageous in the case of an advantageous embodiment to minimize the lengths of the lines and the resulting electrical output resistances, if the electronic unit EPB+ESC–EPB–ESC–ECU and the current source 14 are arranged in relatively close proximity to each other in a common installation space, for example, in particular in an engine compartment or trunk of a motor vehicle, so that the connection 17 can be kept relatively short. Considered overall, a fundamental guideline for measuring the lengths of all the electrical lines of the system can be the fact that a quotient obtained from the length of a longest supply line 12, 13 on the one hand, and from the length of an electrical connection 17 between the electrical current source 14 and the electronic unit EPB+ESC–EPB–ESC–ECU on the other hand amounts at least to approximately 2 or more. It is particularly preferred to aim for a quotient between approximately 3 and 10, wherein also for reducing in principle the electrical resistances a comparatively short length of the individual wire is in principle to be aimed for. The terms 'length of line' or 'length of wire' are generally defined such that components thereof that are in principle carrying current, for example in particular so-called power rails or also other components fixed to the vehicle or chassis, are to be provided with a current supply function for the actuators 10, 11.

An electronic operating method is described in detail hereinunder. In accordance with the invention, an automated, self-learning configuration routine of the electronic unit EPB–ESC–ECU is performed fundamentally, for example periodically, if a predetermined condition occurs or in response to a demand. The configuration routine is preferably performed during the operation of the motor vehicle. The configuration routine of the electronic unit EPB–ESC–ECU does not necessarily have to include all the important parameters or characteristics stored in the EPB–ESC–ECU for performing an electronic control process, on the contrary, it can involve selected parameters that are, for example, only relevant to comfort. Consequently, the configuration routine can involve only selected parameters. In addition, a basic functionality of the motor vehicle brake system 1 can constantly be guaranteed and protected, in that predetermined data or sets of data are permanently stored in a read-only memory, which data or sets of data are used for control purposes as a fallback option in place of the determined characteristics or parameters, for example, following a configuration routine that has been performed incorrectly.

In an advantageous embodiment of the invention, the characteristics and/or parameters that are read in during the configuration routine are, in particular, a static coefficient of friction $\mu$. The static coefficient of friction of a vehicle relates to a limit state if a vehicle that is on an absolutely planar road surface, only with driver on board and at an idling rotation speed is transferred from a stationary state into a moving state exclusively by clutch activation. This is in relation to a first clutch engaging point (CEP). The coefficient of friction includes internal friction procedures in the motor vehicle, for example, bearing friction in the motor, gears, wheel hubs etc. In addition, the coefficient of friction $\mu$ can relate to rolling friction, for example, a coefficient of rolling friction between tires and road surface, or the total of all the coefficients of friction.

In an advantageous embodiment of the invention, a prevailing coefficient of rolling friction is learned in response to the friction ratios within the vehicle drive train, so that, for example, an automated parking brake release function is provided in this connection with an improved and, in particular, more comfortable functionality.

In the case of a particularly advantageous embodiment of the invention, the self-learning properties extend, in particular, to a prevailing total vehicle mass. The total vehicle mass can be measured or estimated by means of suitable sensors in the running gear.

In a further embodiment of the invention, it is advantageous if the self-learning properties of the electronic unit EPB–ESC–ECU can be performed as required, restricted, limited in time, in periodic cycles, in an automated manner and/or manually in response to a particular activation procedure that can be performed, is performed in particular, by an authorized specialist workshop by means of electronic identification using a separate electronic unit, software, code or the like, wherein this can in principle also be performed in a wireless manner. It goes without saying that any combinations of the mentioned variants are feasible and can contribute to the further detailed arrangement of the method.

Particularly comfortable start-up procedures are possible if the self-configuration routine is performed in each case immediately prior to a subsequent start-up procedure, so that for the comfort function of the automated brake release function in each case it is always the prevailing data, for example, in particular coefficients of rolling friction data and/or vehicle mass data that are provided and stored. It goes without saying that the data can be verified prior to performing an automated brake release function, in particular, if in the meantime the vehicle has not been operated for a longer period of time, which can indicate that the stored characteristics could have changed in the meantime. It is therefore expedient to also store information relating to the system time in conjunction with storing the characteristics/data.

Overall, the invention renders possible an improved, more comfortable operation of additional functionalities in a motor vehicle brake system 1, because the configuration routine of the electronic unit EPB–ESC–ECU is not performed rigidly at the end-of-line but in a more flexible manner with self-learning properties and, as a consequence thereof, the vehicle driver can extend said configuration routine into the normal operation for the duration of the vehicle's serviceable life. It goes without saying that the self-configuration routine comprises substantially prior-ranking parameters, characteristics or the like that are orientated towards comfort and that the parameters and characteristics that relate to safety are stored in a particularly protected manner, i.e. cannot be readily overwritten.

In principle, it is also feasible to safeguard any overwriting and/or deleting of data that is already stored and available, in that an enable function is required.

A by-product of the invention can, for example, reside in the fact that in the event of a released, electro-mechanical actuator 10, 11 and in the presence of defined physical vehicle conditions (vehicle velocity, drive data, road surface data) the prevailing friction ratios are analyzed in such a manner that the determined friction ratios or values are compared with stored desired friction values for the defined vehicle condition, for example, in order to identify in an automated manner a defective or not completely released actuator 10, 11, a bearing defect or similar malfunction.

LIST OF REFERENCE NUMERALS

1 Motor vehicle brake system
2 Brake caliper
3 Brake caliper
4 Brake caliper
5 Brake caliper
6 Assembly
7 Hydraulic actuating means
8 Hydraulic line
9 Hydraulic line
10 Electro-mechanical actuator
11 Electro-mechanical actuator
12 Supply line
13 Supply line
14 Current source
15 Man-machine interface
16 Connection line
17 Connection
18, 19 Sensor
EPB–ESC–ECU Electronic unit
HCU Hydraulic control unit
S Interface
VR Front right
VL Front left
HR Rear right
HL Rear left
COM Bus connection
ESC Electronic stability program
EPB Electric parking brake
μ Coefficient of friction

The invention claimed is:

1. An operating method for a brake system of a motor vehicle comprising electro-mechanical actuators comprising an automated brake release function, the method comprising:
    operating the brake system of the motor vehicle based on an initial software configuration permanently stored in read-only memory when the vehicle is produced,
    automatically configuring the motor vehicle brake system by temporarily storing a subsequent software configuration in read-write memory during operation of the motor vehicle, by an electronic unit (EPB-ESC-EPB-ESC-ECU), in an automated manner, based on at least one signal from at least one of an inclination sensor, a wheel rotation sensor, and a coupling sensor connected to the electronic unit (EPB-ESC-EPB-ESC-ECU), and based on stored parameters, such that brake is operated based on the subsequent software configuration after the automatic configuration,
    transmitting at least one electronic release command to the electro-mechanical actuators in order to release the brake,
    wherein the electronic unit (EPB-ESC-ECU) is networked to other electronic units, sensors and data-bus systems, in order to exchange the signals and data, and
    wherein the routine for providing software, configuring the motor vehicle brake system is embodied in a multi-level manner.

2. The operating method for a motor vehicle as claimed in claim 1, wherein the automated configuration routine is provided for a parking brake system, and is provided subsequent to an end-of-line routine during the running operation of the motor vehicle.

3. The operating method as claimed in claim 1, wherein parameters and characteristics of the motor vehicle brake system are classified in different categories according to a weighting and that according to the weighting selected parameters and characteristics of the motor vehicle brake system are accessible to the automated configuration routine, wherein parameters predetermined on the basis of the weighting, including safety-critical parameters, and characteristics of the motor vehicle brake system are accessible to a separate configuration routine.

4. The operating method as claimed in claim 1, wherein the automated configuration routine is safeguarded.

5. The operating method as claimed in claim 3, wherein the characteristics and parameters that are read in using the automated configuration routine are information regarding a coefficient of friction μ, including a coefficient of rolling friction.

6. The operating method as claimed in claim 5, wherein the characteristics and parameters comprise information regarding a static coefficient of friction in response to the prevailing friction ratios within a vehicle drive train.

7. The operating method as claimed in claim 3, wherein the characteristics and parameters comprise information regarding a prevailing total vehicle mass.

8. The operating method as claimed in claim 1, wherein the automated configuration routine of the motor vehicle brake system is performed on demand in response to a particular activation procedure.

9. The operating method as claimed in claim 8, wherein the automated configuration routine is performed by means of electronic identification using a separate electronic unit and software code.

10. The operating method as claimed in claim 8, wherein the automated configuration routine is performed in each case immediately prior to a subsequent start-up procedure.

11. The operating method as claimed in claim 1, wherein the data that is obtained by means of the automated configuration routine, by communication of the control unit (EPB-ESC-ECU) with other communication participants can be verified.

12. The operating method as claimed in claim 1, wherein after positive confirmation, stored legacy data is replaced by new data that was generated through an automated configuration routine.

* * * * *